Feb. 7, 1933.  R. P. SIMMONS  1,896,104
CEMENT LINING FOR OIL WELLS
Filed Aug. 16, 1929  6 Sheets-Sheet 1

RICHARD P. SIMMONS
INVENTOR

BY Victor J. Evans
ATTORNEY

WITNESS: Daniel Troy

Feb. 7, 1933.　　　　R. P. SIMMONS　　　　1,896,104
CEMENT LINING FOR OIL WELLS
Filed Aug. 16, 1929　　6 Sheets-Sheet 2
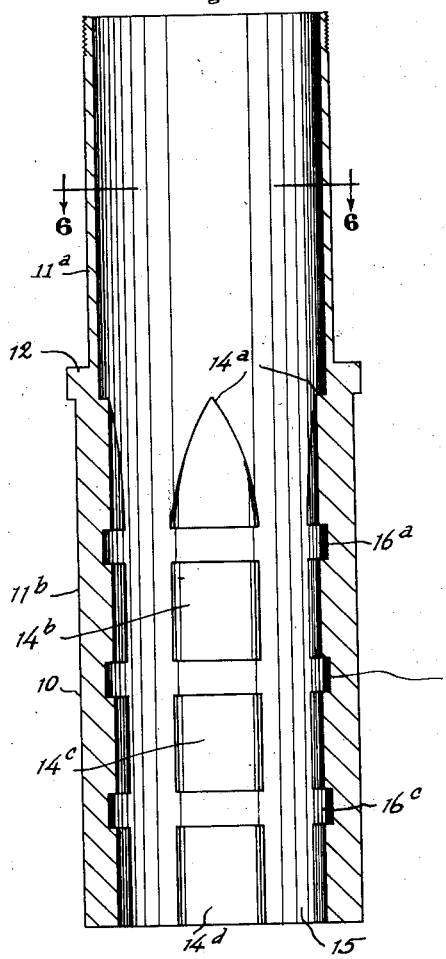
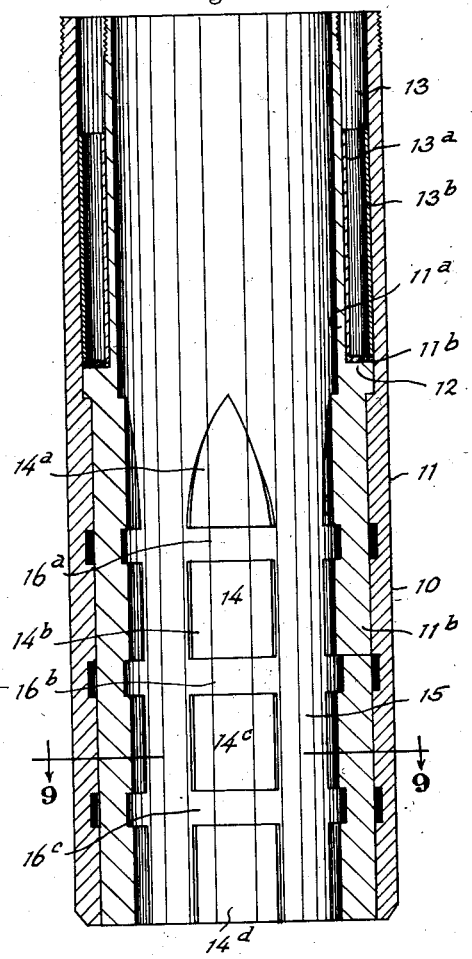
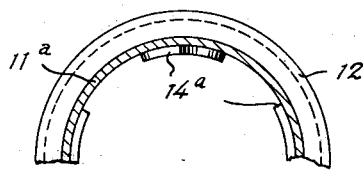
Fig.6.
RICHARD P. SIMMONS
INVENTOR
BY Victor J. Evans
ATTORNEY Feb. 7, 1933.    R. P. SIMMONS    1,896,104
CEMENT LINING FOR OIL WELLS
Filed Aug. 16, 1929    6 Sheets-Sheet 3
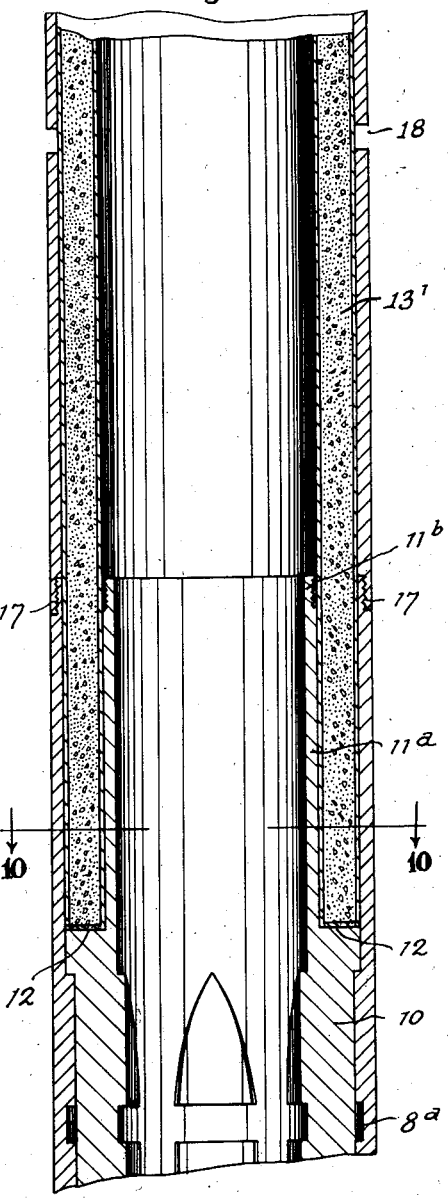
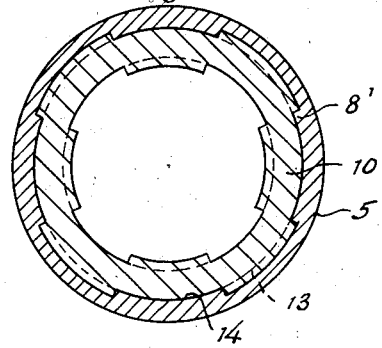
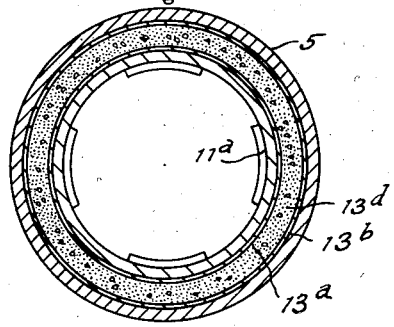
RICHARD P. SIMMONS
INVENTOR
BY *Victor J. Evans*
ATTORNEY
WITNESS: *Daniel Troy*

Feb. 7, 1933. R. P. SIMMONS 1,896,104
CEMENT LINING FOR OIL WELLS
Filed Aug. 16, 1929 6 Sheets-Sheet 4
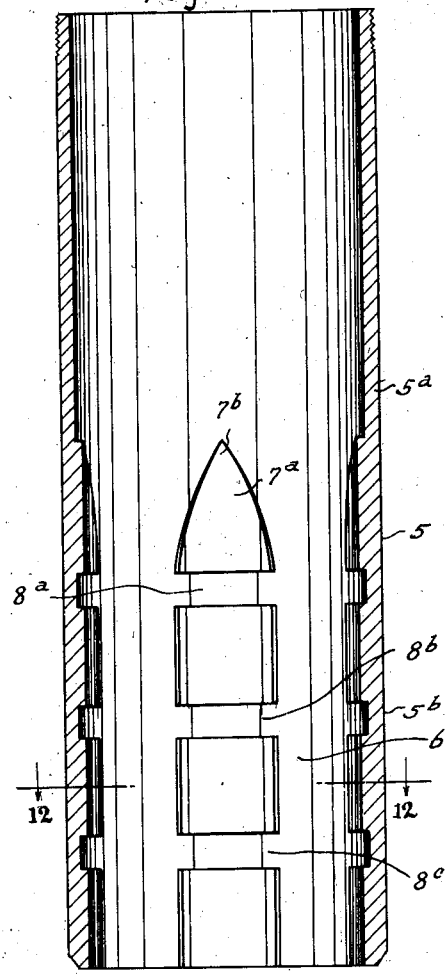
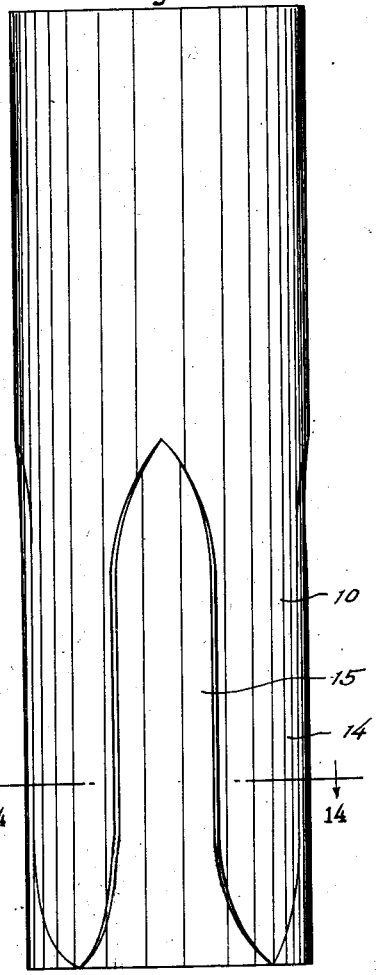
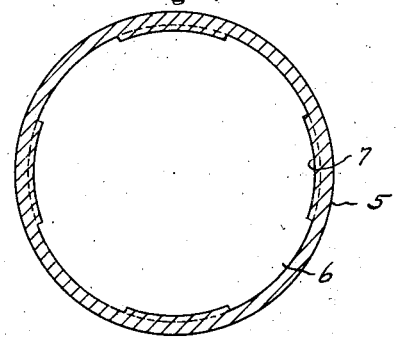
RICHARD P. SIMMONS
INVENTOR
BY Victor J. Evans
ATTORNEY Feb. 7, 1933.  R. P. SIMMONS  1,896,104
CEMENT LINING FOR OIL WELLS
Filed Aug. 16, 1929   6 Sheets-Sheet 5

RICHARD P. SIMMONS
INVENTOR

BY Victor J. Evans
ATTORNEY

WITNESS:

Feb. 7, 1933. R. P. SIMMONS 1,896,104
CEMENT LINING FOR OIL WELLS
Filed Aug. 16, 1929 6 Sheets-Sheet 6
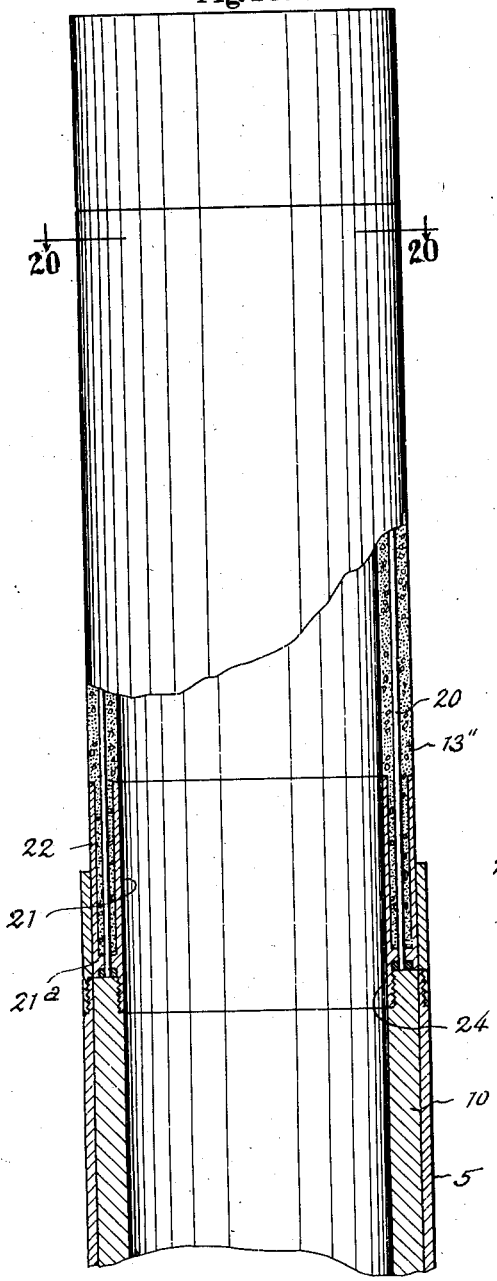
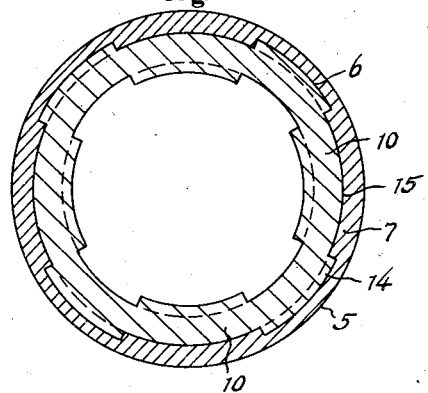
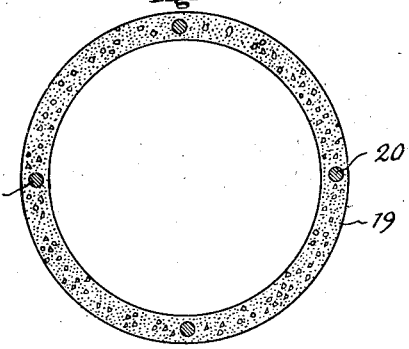
Richard P. Simmons
INVENTOR
BY Victor J. Evans
ATTORNEY Patented Feb. 7, 1933

1,896,104

UNITED STATES PATENT OFFICE

RICHARD P. SIMMONS, OF NEW YORK, N. Y.

CEMENT LINING FOR OIL WELLS

Application filed August 16, 1929. Serial No. 386,353.

The invention in particular relates to improvements in well apparatus, and its leading object is to improve the casing construction and tubular wall parts which are to be used inside of the same, for various operations with special equipments to be installed in the casing, and especially those belonging to the general system invented by me and disclosed in my copending applications, Ser. No. 272,799, filed April 25, 1929, Ser. No. 213,381, (Patent #1,687,399), etc., etc.

One of the objects of the present invention is to utilize the means for locking a tubular carrying wall to the casing wall, as shown in a copending patent application of mine as aforesaid; which involves a forced longitudinal alignment of the related parts, for locking an auxiliary tubular wall to the one connected directly to the casing, to provide a mounting for a reduction unit to be installed therein.

A still further object of the invention is the provision of means for mounting the successive longitudinal sections of the tubular well lining, and preferably also of a bore reducing equipment, composed partly or wholly of concrete or similar material, so that the cost of installing well operating equipment will be materially reduced and a tubular well lining of various working bores may be established in the well characterized by a high compressive strength, and an ability to resist corrosion indefinitely.

Other objects and advantages of the invention will be hereinafter specifically pointed out, or will become apparent, as the specification proceeds.

With the above indicated objects in view, the invention resides in certain novel constructions and combinations and arrangement of parts and methods and method steps, clearly described in the following specification and fully illustrated in the accompanying drawings, which latter show an embodiment of the apparatus of the invention as at present preferred.

In the drawings:—

Fig. 5 is a vertical sectional view of the head shown in Fig. 3.

Fig. 6 is a cross sectional view thereof, taken on line 6—6 of Fig. 5, looking in the direction of the arrows.

Fig. 7 is a vertical sectional view of the casing head and the reducing head in locked relation, before the cement wall, where the same is to be formed in situ, is poured in place.

Fig. 8 is a vertical sectional view through the combined head construction, showing the completed poured cement wall.

Fig. 9 is a cross sectional view taken on line 9—9 of Fig. 7, looking in the direction of the arrows.

Fig. 10 is a cross sectional view taken on line 10—10 of Fig. 8, looking in the direction of the arrows.

Fig. 11 is a vertical sectional view of the casing head of Fig. 1.

Fig. 12 is a cross sectional view taken on line 12—12 of Fig. 11, looking in the direction of the arrows.

Figure 13 is an elevational view of a modified form of reducing head.

Fig. 14 is a similar view, but fragmentarily taken on line 14—14 of said Fig. 13, looking in the direction of the arrows.

Fig. 18 is a view partly in elevation and partly in longitudinal section, showing another modified casing construction.

Fig. 19 is a transverse sectional view taken on line 19—19 of Fig. 17, looking in the direction of the arrows.

Fig. 20 is a transverse sectional view taken on line 20—20 of Fig. 18.

Similar reference characters refer to similar parts throughout the several views of the drawings.

Figure 1:
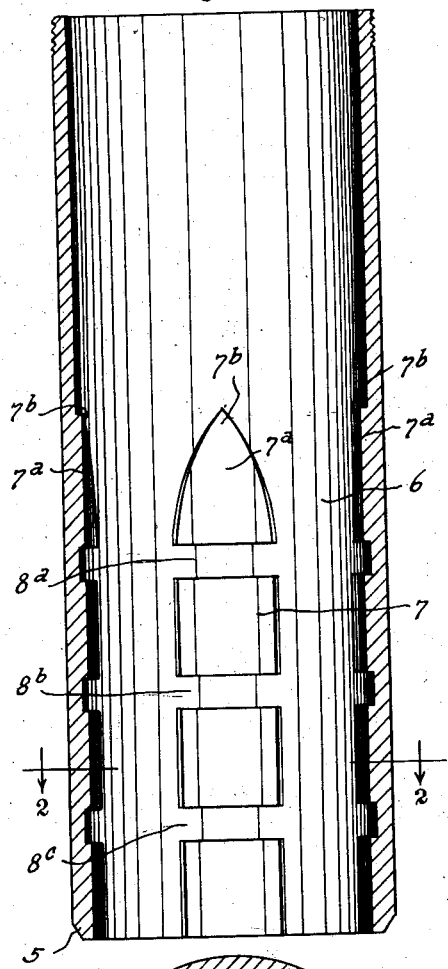
Fig. 1 is a vertical sectional view of the lower end section of the casing.
Figure 3:
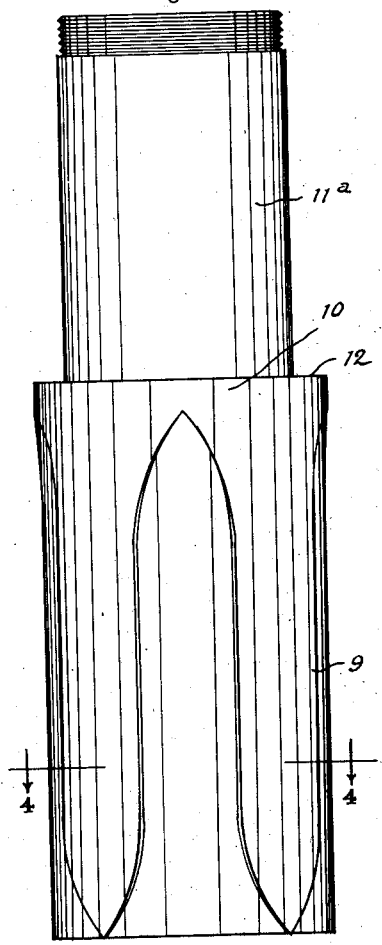
Fig. 3 is a side elevation of a reducing head insertable in the casing section shown in Fig. 1.
Figure 2:
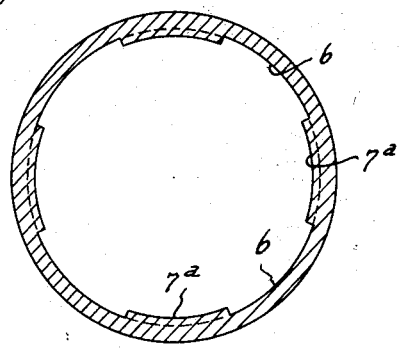
Fig. 2 is a cross sectional view, taken on line 2—2 of Fig. 1, looking in the direction of the arrows.
Figure 4:
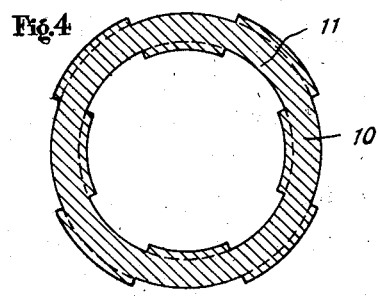
Fig. 4 is a cross sectional view taken on line 4—4 of Fig. 3, looking in the direction of the arrows.

Referring to the accompanying drawings illustrating the invention in detail 5 designates the head section of the casing, which is preferably constructed of metal, and is provided with a series of longitudinal keyways or splines 6, which are radially spaced from each other by the longitudinal keys 7. The keys 7 are transversely divided into sections 7a by the transverse keyways 8a, 8b, and 8c, which are arranged one above the other. The keyways 8a are all located in the same plane, the keyways 8b in a common but different plane from that of the keyweys 8a, and the keyways 8c in still a different plane from the keyways 8a and 8b.

The uppermost section 7a of each key 7 is formed with a tapered upper end 7b, designed to permit easy insertion of the longitudinal keyways 9 of the reducing head 10 which is designed to be forcibly aligned with any one of the keys 7 of the casing head.

This reducing head is of tubular construction, but the upper part 11a of its wall 11 is reduced from the shoulder 12 to the extreme upper end thereof, so that an annular chamber 13 is established between this reduced wall and the enclosing wall of the casing head, as shown in Fig. 7. The thicker section 11b of the wall 11 is reduced internally to provide the integral longitudinal keys 14, radially spaced from each other to provide the longitudinal keyways 15. Each of the keys 14 is divided into sections 14a, 14b, 14c and 14d, which are separated to provide transverse keyways 16a, 16b, and 16c. The uppermost key section 14a is tapered so that a key of corresponding shape may easily pass the same.

In this application no means are disclosed for interlocking with the transverse keyways. These keyways are provided to permit the use of the coupling means shown in my copending patent aforesaid whenever the field practice needs require.

The upper pointed ends of the internal keys 7 of the well casing 5, form limit supporting stops which engage corresponding keyways formed between the external keys 9 of the locking and reducing head which is inserted within the lower end section of the well casing 5. By the interfitting engagement between the reducing head 10 and the well casing, the two are locked together against relative rotative movement, and also to support the reducing head against falling into the well or leaving the well casing, while at the same time permitting its free upward withdrawal.

When it is desired to support a pumping unit within the well casing the reducing head may be omitted, and in this case the transverse keyways 8a of the well casing may be used for locking the pumping unit installed against upward movement, by the use of mechanism as shown in my copending application Serial No. 272,799, filed April 25th, 1929.

In the annular chamber 13 provided between the reduced upper end of the head 10 and the casing an annular metal lining 13a is placed around the reduced wall part 11a, and a larger annular or tubular metal lining 13b is placed against the inside surface of the reduced wall section 11a. In the annular space between these two interfitted linings cement or concrete is poured, so that a reinforced tubular wall of cement or concrete is constructed by a casting-in-situ operation, as shown best in Figs. 7 and 8.

The hardened cement or concrete 13' unites with the two metal linings to form a reinforced inner casing wall of high compressive strength, which will effectually resist corrosion. The metal lining is preferably galvanized or otherwise protected against rusting so that the concrete wall will slide readily into and out of well line position, as indicated in Fig. 8.

The wall is continued from the shoulder 12 to the ground surface by successive steps of inserting the double lining and then pouring the wall with plastic materials. The sections of the inner casing 11a may be uncoupled at 11b, or cut as indicated at 18 with reference to the outer casing. The outer casing may be cut, as at 18, Fig. 8, by a suitable tool lowered to place in the well, before the annular sheet metal lining 13a and 13b have been inserted in place. Without removing the metal well casing 5 the cement may be poured in the annular space between the lining forms 13a and 13b and at a suitable period in the development of the poured cement wall this metal well casing 5 may be removed.

In Fig. 18 a precast auxiliary or inner casing 13'' made up of reinforced concrete or cement is shown. This casing 13'' has embedded therein the longitudinal reinforcing rods 20, the ends of which project through end walls 21a of the metal coupling sleeves 21 which are carried on each end of the precast pipe or casing section. These sleeves are formed with integral metal linings 22, each sleeve and each lining being connected by the end wall 21a, from which the tubular externally threaded section 24 extends to couple the precast casing section with the reducing head 10, as shown in Fig. 18.

The sleeve 21 on the lower end of the precast tubular wall section is provided with external screw threads, carried by the tubular extension 24, and these are designed to cooperate with internal or female screw threads formed in the sleeve 21 on the upper end of the precast wall section. These sleeves are spaced apart from each other by means of the tie rods 20, the ends of which are suitably headed with nuts or the like, which bear against the end walls 21a of the lower and upper sleeves, and serve to resist crushing of the precast wall, and also to give greater rigidity to this precast wall, before being assembled in place and after, since the tie rods bind the cement and resist distortion of the wall section. By means of the cooperating sleeve threads one precast tubular wall section may be threaded into the other, in vertical well formation, as shown in Fig. 18, so as to make a continuous and substantially watertight wall for supporting the natural wall of the well.

Figure 15:
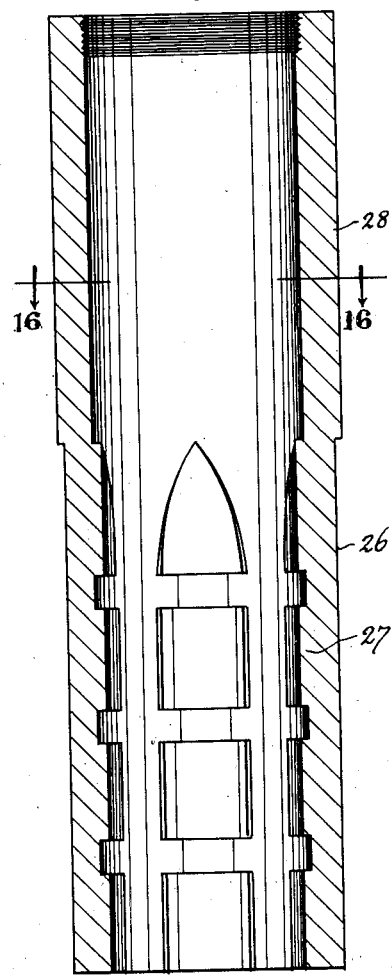
Fig. 15 is a longitudinal sectional view through the modified form of the reducing head shown in Fig. 11.
Figure 17:
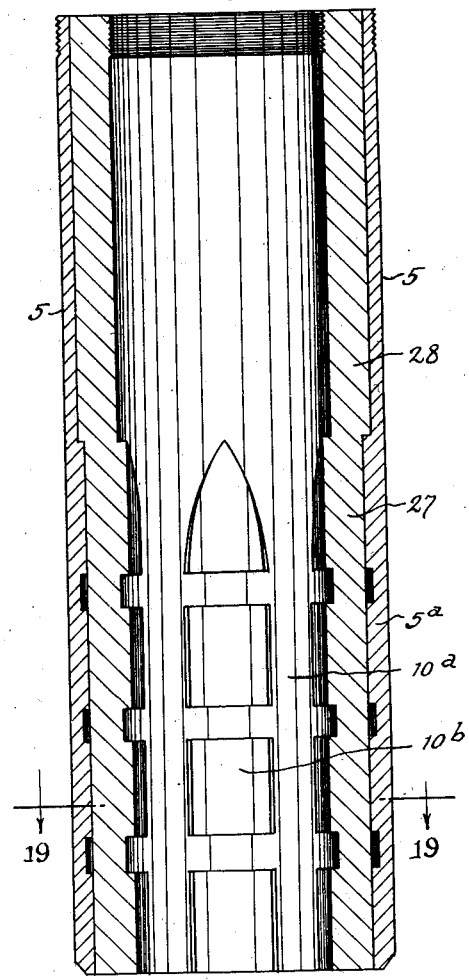
Fig. 17 is a longitudinal sectional view showing the modified reducing head and modified casing head in locked relation.
Figure 16:
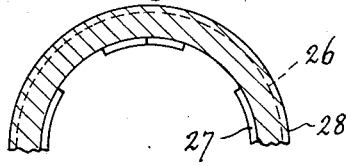
Fig. 16 is a transverse sectional view taken on line 16—16 of Fig. 15, looking in the direction of the arrows.

In Figs. 15 and 17, I show a modified construction, comprising a combination with the casing head 5 of a reducing head 26, which is constructed with a lower end portion or locking part 27 identical in general construction with the reducing head shown in Fig. 7, with the exception that the upper part 28 of this reducing head is made of the combined thickness which the reduced wall section and the auxiliary casing cement wall produce, as shown in Fig. 7.

The reinforced inner casing wall 19, shown in Fig. 18, is threaded to this modified reducing head.

The reducing head 10 is provided with a system of internal longitudinal keyways 10a and longitudinal keys 10b, of the type previously described with reference to the internal keys and keyways of the casing head, so that any desired equipment may be locked against relative rotative movement, or against both rotative movement in the reducing head and against longitudinal movement therein, by utilizing the couplings shown in either of my copending applications, with such minor adaptations as the requirements of the situation might dictate.

In the ordinary practice of boring oil and similar deep wells, small diameter casings are employed. These casings limit delivery of oil or water in the early life of the well, when the ground pressure is sufficient to lift the oil or water to the surface of the ground and for a considerable distance above it.

As the oil or water is withdrawn the ground pressure in many wells tends to fall, so that the output of the well falls to a point where the operation of special pumping units lowered down the well, is made necessary.

With small diameter well casings the capacity of any pumping unit, which is lowered in the well and started in operation, will be governed by the diameter of the casing, less the loss of piston diameter due to the thickness of the pump cylinder and associated parts, which tend to reduce the effective bulk of the pumping unit.

Any steel well casing tends to corrode, due to the action of the earth and well waters and corroding influences upon it, so that the life of the steel casing is shortened. Once a casing has been installed it is an expensive operation to remove it and install another one.

By means of the present invention a well of relatively large diameter may be bored in the ground, and a casing of high compressive strength and practically of endless life, because of its non-corrosive characteristics, may be installed in the well, at a small fraction of the cost of steel casings, and with the aid of the reducing head, the diameter of the oil or water column lifted may be reduced as the output of the well decreases with the gradual exhaustion of the oil or water supply, or the reduction of the ground pressures acting upon it.

The longitudinal coupling keys and keyways lock the interfitting parts carrying the locking elements against relative rotative movement, but permit of free longitudinal movement.

The casing and reducing heads shown are particularly designed to permit of the use of pumping units of various diameters and capacities, as well as conditions and output changes, so that the weight of the oil or water column to be lifted will be controllable, and adequate well output maintained under conditions which have always resulted, with present equipment, in material reduction of output. The larger the size of the pumping unit the greater may be the volume of energy applied to lift the oil or water, but if the size of the casing increases the burden of lifting the oil or water beyond the limits of the pumping unit, so that delivery at the mouth of the well is threatened, then a reduction of the diameter of the casing will enable the well operator to maintain output with changed supply and ground pressure conditions.

When it is desired to install a pumping unit or similar equipment in the well, the operation of which would tend to lift the reducing head, then the lateral locking means for preventing relative longitudinal movement, shown in either of my copending patent applications, Ser. No. 272,799, filed April 25, 1929, and Ser. No. 213,381, (Patent #1,687,399) etc., etc., may be employed to engage with the transverse keyways.

The hereinbefore described constructions and methods admit of considerable modification without departing from the invention; therefore, I do not wish to be limited to the precise arrangements and processes and steps shown and described, or referred to, which are, as aforesaid, by way of illustration merely. In other words, the scope of protection contemplated is to be taken solely from the appended claims, interpreted as broadly as is consistent with the prior art.

What I claim as new, is:—

1. A well apparatus consisting of an outer casing having a series of longitudinal keyways therein, a tubular reducing head having external keys to slidably interlock with the internal keyways of the casing, a relatively thin tubular wall carried by the reducing head and spaced concentrically from the wall of the casing, and a tubular inner casing of cemented material connected with the thin tubular wall and providing a non-corrosive casing wall of high compressive strength.

2. A well apparatus consisting of an outer casing having a series of internal longitudinal keys and keyways therebetween, a tubular reducing head having a corresponding series of external keys and keyways to slidably interlock with the internal keys and keyways, said reducing head having a wall thickness substantially greater than that of the wall of the casing, an integral tubular wall extending upwardly from the head of the reducing head and providing an annular space between itself and the wall of the casing, and interfitting metal linings arranged in the annular space to permit of the casting in place of a tubular inner casing of poured cement material.

3. The method of constructing well casings consisting in locating a tubular casing head in the well, rigidly interlocking a tubular reducing head in and directly to the casing head, to establish a bottom-enclosed annular pouring chamber between the reducing head and the casing head, lining said pouring chamber, and casting a tubular casing wall in said annular pouring chamber by admitting a cement material thereto in union with said lining.

4. The method of constructing well casings consisting in locating a tubular casing in the well, interlocking a tubular reducing head within the casing, establishing an annular pouring chamber between the reducing head and the casing, inserting tubular metal linings in said annular space in concentrically spaced relation to each other, and pouring concrete into said space between said metal linings.

5. The method of constructing well casings, consisting in placing an outer casing in position in the well, interlocking an inner form to said outer casing whereby to establish an annular pouring space within the outer casing, pouring a tubular inner casing wall in the space between said outer casing and form, and subsequently withdrawing that portion of the outer casing above the interlock.

6. The method of constructing well casings, consisting in placing an outer well casing in the well, placing a cylindrical member within said outer casing to establish a concentric pouring chamber therebetween, disposing concentrically spaced cylindrical metal reinforcing elements in said chamber, one against the outer casing and one against the cylindrical member, and casting a concrete wall between the two reinforcing elements.

7. A well casing equipment comprising an outer casing, a tubular reducing head within said casing having an internal axial bore of approximately the standard diameter desired for the well, coupling means between the reducing head and the outer casing to lock the two against relative rotative movement, and an upwardly extending thin-walled inner casing carried by the reducing head, said inner casing defining a bore of the approximate internal diameter of the desired standard casing bore, said reducing head having internal coupling means for attachment of well forming equipment.

8. An oil well lining including, in combination with a well bore, a plurality of superimposed precast tubular wall cement sections, each section having a reinforcing end member consisting of annular walls rigidly connected in concentrically spaced relation from each other to receive the cement material forming the body of the well.

9. An oil well lining including the combination with a well bore, of a precast tubular wall-forming unit having a metal tube enclosing each end thereof and a metal tube disposed against the interior of each end thereof.

10. An oil well lining including the combination with a well bore, of a plurality of wall forming units, each unit consisting of a precast tubular cement body and reinforcing members on its ends, each reinforcing member consisting of a coupling part and concentrically spaced tubular parts between which the end of the tubular cement is inserted, the end of one unit being coupled to the opposing end of the adjacent unit.

11. A well apparatus consisting of a well casing having circumferentially spaced internal supporting means, a reducing head insertable therein and provided with means to seat on said supports and at the same lock the head therein, against relative rotative movement, a tubular extension for said head concentrically spaced from the well casing to provide an annular chamber and an inner and outer tubular metal lining in said annular chamber to permit of the detachment of the outer casing after a cement wall is poured in said annular chamber, said cement wall being continued to the head of the well.

12. A well apparatus including an outer casing having a series of internal longitudinal keyways, a tubular reducing head insertable in said casing, said reducing head having a series of external longitudinal keys to slidably interlock with the internal keyways of the casing, said reducing head having an upwardly extending tubular portion of less external diameter than said reducing head and of less external diameter than the interior wall of said outer casing, whereby to form an annular casting chamber between said reducing head and the interior wall of said outer casing.

In testimony whereof I hereby affix my signature.

RICHARD P. SIMMONS.